United States Patent
Haritaoglu et al.

(10) Patent No.: US 11,032,588 B2
(45) Date of Patent: Jun. 8, 2021

(54) METHOD AND APPARATUS FOR SPATIAL ENHANCED ADAPTIVE BITRATE LIVE STREAMING FOR 360 DEGREE VIDEO PLAYBACK

(71) Applicant: Google Inc., Mountain View, CA (US)

(72) Inventors: Ismail R. Haritaoglu, Palo Alto, CA (US); Oztan Harmanci, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/595,744

(22) Filed: May 15, 2017

(65) Prior Publication Data
US 2017/0332117 A1 Nov. 16, 2017

Related U.S. Application Data

(60) Provisional application No. 62/336,823, filed on May 16, 2016.

(51) Int. Cl.
*H04N 7/173* (2011.01)
*H04N 21/2343* (2011.01)
(Continued)

(52) U.S. Cl.
CPC ... *H04N 21/234363* (2013.01); *H04N 19/597* (2014.11); *H04N 21/2353* (2013.01);
(Continued)

(58) Field of Classification Search
CPC ..... H04N 21/234363; H04N 21/23439; H04N 21/2353; H04N 21/44204; H04N 21/44012
(Continued)

(56) References Cited

U.S. PATENT DOCUMENTS 5,513,260 A  4/1996 Ryan
5,577,135 A  11/1996 Grajski et al.
(Continued)

FOREIGN PATENT DOCUMENTS

CN  101325687 A  12/2008
CN  101589617 A  11/2009
(Continued)

OTHER PUBLICATIONS

International Search Report and the Written Opinion for International Application No. PCT/US2017/032966, dated Jul. 3, 2017, 6 pages.
(Continued)

*Primary Examiner* — Jivka A Rabovianski
(74) *Attorney, Agent, or Firm* — Lowenstein Sandler LLP

(57) ABSTRACT

An apparatus and method for delivering a spatially enhanced live streaming experience for virtual reality or 360 degree live streaming of video is disclosed. A live streaming video signal is encoded into multiple streams at varying resolutions. A portion of the high resolution video stream, corresponding to a field of view within the entire 360 degree view, is merged with a low resolution video stream. The resulting video stream is referred to as a spatial adaptive video stream. Multiple spatial adaptive video streams are generated to provide a high resolution field of view across the entire 360 degrees. As the viewer looks in different directions, the video player plays back one of the spatial adaptive video streams according to the direction in which the viewer is looking.

18 Claims, 8 Drawing Sheets

(51) Int. Cl.
   *H04N 19/597* (2014.01)
   *H04N 21/2365* (2011.01)
   *H04N 21/235* (2011.01)
   *H04N 21/435* (2011.01)
   *H04N 21/437* (2011.01)
   *H04N 21/442* (2011.01)
   *H04N 21/472* (2011.01)
   *H04N 21/658* (2011.01)
   *H04N 21/81* (2011.01)
   *H04N 21/845* (2011.01)

(52) U.S. Cl.
   CPC ... *H04N 21/2365* (2013.01); *H04N 21/23439* (2013.01); *H04N 21/435* (2013.01); *H04N 21/437* (2013.01); *H04N 21/44218* (2013.01); *H04N 21/47202* (2013.01); *H04N 21/47217* (2013.01); *H04N 21/6581* (2013.01); *H04N 21/816* (2013.01); *H04N 21/8456* (2013.01)

(58) Field of Classification Search
   USPC .......................................... 725/91, 93, 136
   See application file for complete search history.

(56) References Cited

U.S. PATENT DOCUMENTS

| | | | |
|---|---|---|---|
| 5,659,613 | A | 8/1997 | Copeland et al. |
| 5,668,603 | A | 9/1997 | Copeland |
| 5,721,788 | A | 2/1998 | Powell et al. |
| 5,883,959 | A | 3/1999 | Kori |
| 5,917,943 | A | 6/1999 | Washizawa |
| 6,018,374 | A | 1/2000 | Wrobleski |
| 6,026,189 | A | 2/2000 | Greenspan |
| 6,173,275 | B1 | 1/2001 | Caid et al. |
| 6,373,960 | B1 | 4/2002 | Conover et al. |
| 6,381,367 | B1 | 4/2002 | Ryan |
| 6,404,925 | B1 | 6/2002 | Foote et al. |
| 6,438,275 | B1 | 8/2002 | Martins et al. |
| 6,539,395 | B1 | 3/2003 | Gjerdingen et al. |
| 6,711,293 | B1 | 3/2004 | Lowe |
| 6,774,917 | B1 | 8/2004 | Foote et al. |
| 6,785,815 | B1 | 8/2004 | Serret-Avila et al. |
| 6,937,766 | B1 | 8/2005 | Wilf et al. |
| 6,975,746 | B2 | 12/2005 | Davis et al. |
| 6,975,755 | B1 | 12/2005 | Baumberg |
| 7,043,019 | B2 | 5/2006 | Tehranchi et al. |
| 7,055,169 | B2 | 5/2006 | Delpuch et al. |
| 7,167,574 | B2 | 1/2007 | Kim |
| 7,177,470 | B2 | 2/2007 | Jasinschi et al. |
| 7,185,201 | B2 | 2/2007 | Rhoads et al. |
| 7,218,754 | B2 | 5/2007 | Schumann et al. |
| 7,272,240 | B2 | 9/2007 | Goldberg et al. |
| 7,298,930 | B1 | 11/2007 | Erol et al. |
| 7,325,013 | B2 | 1/2008 | Caruso |
| 7,421,376 | B1 | 9/2008 | Caruso et al. |
| 7,650,361 | B1 | 1/2010 | Wong et al. |
| 8,099,508 | B2 | 1/2012 | Mao et al. |
| 8,160,366 | B2 | 4/2012 | Nakamura et al. |
| 8,200,021 | B2 | 6/2012 | Iwamoto et al. |
| 8,515,212 | B1 | 8/2013 | Bengio et al. |
| 8,515,241 | B2 | 8/2013 | Forsyth et al. |
| 8,607,283 | B2 | 12/2013 | Civanlar et al. |
| 8,677,428 | B2 | 3/2014 | Lewis et al. |
| 8,887,215 | B2 | 11/2014 | Fisher et al. |
| 8,943,215 | B2 | 1/2015 | Patten et al. |
| 9,015,151 | B1 | 4/2015 | Margulis et al. |
| 9,066,115 | B1 | 6/2015 | Cherry et al. |
| 9,066,138 | B1 | 6/2015 | Kraiman et al. |
| 9,084,030 | B1 | 7/2015 | Nijim et al. |
| 9,167,278 | B2 | 10/2015 | Sinha et al. |
| 9,491,499 | B2 | 11/2016 | Wagenaar et al. |
| 9,613,042 | B1 | 4/2017 | Joseph et al. |
| 9,654,817 | B2 | 5/2017 | Li et al. |
| 10,104,137 | B2 | 10/2018 | Salomons |
| 10,148,716 | B1 | 12/2018 | Joseph et al. |
| 10,595,054 | B2 | 3/2020 | Turgut |
| 10,785,508 | B2 | 9/2020 | Haritaoglu et al. |
| 2002/0159641 | A1 | 10/2002 | Whitney et al. |
| 2003/0005454 | A1 | 1/2003 | Rodriguez et al. |
| 2003/0033347 | A1 | 2/2003 | Bolle et al. |
| 2003/0045954 | A1 | 3/2003 | Weare et al. |
| 2003/0151621 | A1 | 8/2003 | McEvilly et al. |
| 2003/0195883 | A1 | 10/2003 | Mojsilovic et al. |
| 2003/0229900 | A1 | 12/2003 | Reisman |
| 2004/0022447 | A1 | 2/2004 | Mukhopadhyay et al. |
| 2004/0085339 | A1 | 5/2004 | Divakaran et al. |
| 2004/0221237 | A1 | 11/2004 | Foote et al. |
| 2004/0260786 | A1 | 12/2004 | Barile |
| 2005/0041159 | A1 | 2/2005 | Nakamura et al. |
| 2005/0125368 | A1 | 6/2005 | Akahori |
| 2005/0251532 | A1 | 11/2005 | Radhakrishnan et al. |
| 2005/0262245 | A1 | 11/2005 | Menon et al. |
| 2005/0278736 | A1 | 12/2005 | Steelberg et al. |
| 2005/0289347 | A1 | 12/2005 | Ovadia |
| 2006/0029253 | A1 | 2/2006 | Pace |
| 2006/0101060 | A1 | 5/2006 | Li et al. |
| 2006/0111801 | A1 | 5/2006 | Weare et al. |
| 2006/0271973 | A1 | 11/2006 | Jerding et al. |
| 2006/0279628 | A1 | 12/2006 | Fleming |
| 2006/0291690 | A1 | 12/2006 | Roberts |
| 2007/0025606 | A1 | 2/2007 | Gholap et al. |
| 2007/0128899 | A1 | 6/2007 | Mayer |
| 2007/0157231 | A1 | 7/2007 | Eldering et al. |
| 2007/0217676 | A1 | 9/2007 | Grauman et al. |
| 2007/0253594 | A1 | 11/2007 | Lu et al. |
| 2007/0282898 | A1 | 12/2007 | Stark et al. |
| 2008/0027931 | A1 | 1/2008 | Lu et al. |
| 2008/0040807 | A1 | 2/2008 | Lu et al. |
| 2008/0012397 | A1 | 5/2008 | Coombs et al. |
| 2008/0166057 | A1 | 7/2008 | Nakajima |
| 2008/0186413 | A1 | 8/2008 | Someya et al. |
| 2008/0271080 | A1 | 10/2008 | Gossweiler et al. |
| 2009/0074235 | A1 | 3/2009 | Lahr et al. |
| 2009/0089838 | A1 | 4/2009 | Pino, Jr. et al. |
| 2009/0113512 | A1 | 4/2009 | Collet et al. |
| 2009/0193473 | A1 | 7/2009 | Moon et al. |
| 2009/0204901 | A1 | 8/2009 | Dharmaji et al. |
| 2009/0324026 | A1 | 12/2009 | Kletter |
| 2010/0138865 | A1 | 6/2010 | Rai et al. |
| 2010/0162330 | A1 | 6/2010 | Herlein et al. |
| 2010/0299438 | A1 | 11/2010 | Zimmerman et al. |
| 2011/0078551 | A1 | 3/2011 | Zhang et al. |
| 2011/0191692 | A1 | 8/2011 | Walsh et al. |
| 2011/0219035 | A1 | 9/2011 | Korsunsky et al. |
| 2011/0314493 | A1 | 12/2011 | Lemire et al. |
| 2012/0159337 | A1 | 6/2012 | Travilla et al. |
| 2012/0216121 | A1* | 8/2012 | Lin ............... H04N 21/234327 715/721 |
| 2012/0240176 | A1 | 9/2012 | Ma et al. |
| 2012/0275597 | A1 | 11/2012 | Knox et al. |
| 2013/0163758 | A1 | 6/2013 | Swaminathan et al. |
| 2013/0195204 | A1* | 8/2013 | Reznik ................ H04N 19/85 375/240.26 |
| 2013/0219178 | A1 | 8/2013 | Xiques et al. |
| 2013/0291002 | A1 | 10/2013 | Rothschild et al. |
| 2013/0311780 | A1 | 11/2013 | Besehanic |
| 2014/0095890 | A1 | 4/2014 | Mangalore et al. |
| 2014/0115060 | A1 | 4/2014 | Kim et al. |
| 2014/0136661 | A1 | 5/2014 | Handa |
| 2014/0181656 | A1 | 6/2014 | Kumar et al. |
| 2014/0201334 | A1 | 7/2014 | Wang et al. |
| 2014/0259051 | A1 | 9/2014 | Strein et al. |
| 2014/0280781 | A1 | 9/2014 | Gregotski |
| 2014/0337904 | A1 | 11/2014 | Panje et al. |
| 2015/0058709 | A1 | 2/2015 | Zaletel |
| 2015/0113021 | A1 | 4/2015 | Martin |
| 2015/0172342 | A1 | 6/2015 | Yin |
| 2015/0208103 | A1 | 7/2015 | Guntur et al. |
| 2015/0346832 | A1* | 12/2015 | Cole ................ H04N 13/0014 345/156 |
| 2015/0365622 | A1* | 12/2015 | Ushiyama ............. H04N 5/765 386/230 |
| 2015/0365725 | A1 | 12/2015 | Belyaev et al. |

(56) References Cited

U.S. PATENT DOCUMENTS

| | | |
|---|---|---|
| 2015/0382042 A1 | 12/2015 | Wagenaar et al. |
| 2016/0065946 A1 | 3/2016 | Cole et al. |
| 2016/0080470 A1 | 3/2016 | Shanson |
| 2016/0080810 A1 | 3/2016 | Dutta et al. |
| 2016/0127260 A1 | 5/2016 | Gordon |
| 2016/0127440 A1 | 5/2016 | Gordon |
| 2016/0134910 A1 | 5/2016 | Davis et al. |
| 2016/0149699 A1 | 5/2016 | Gauda |
| 2016/0173961 A1 | 6/2016 | Coan et al. |
| 2016/0198202 A1 | 7/2016 | Van Brandenburg et al. |
| 2016/0224799 A1 | 8/2016 | Uzen et al. |
| 2016/0227279 A1 | 8/2016 | Fang et al. |
| 2016/0316233 A1 | 10/2016 | Ghadi et al. |
| 2016/0337704 A1 | 11/2016 | Binder et al. |
| 2017/0064400 A1 | 3/2017 | Riegel et al. |
| 2017/0070758 A1 | 3/2017 | Phillips et al. |
| 2017/0085933 A1 | 3/2017 | Czeck, Jr. et al. |
| 2017/0150190 A1 | 5/2017 | Tarbox et al. |
| 2017/0280181 A1 | 9/2017 | Ramaley |
| 2017/0302753 A1 | 10/2017 | Larumbe et al. |
| 2017/0308681 A1 | 10/2017 | Gould et al. |
| 2017/0353516 A1 | 12/2017 | Gordon |
| 2018/0063594 A1 | 3/2018 | Alexander et al. |

FOREIGN PATENT DOCUMENTS

| | | |
|---|---|---|
| CN | 101689184 A | 3/2010 |
| CN | 103491457 A | 1/2014 |
| WO | 2006122320 A1 | 11/2006 |
| WO | 2007/148290 | 12/2007 |

OTHER PUBLICATIONS

D. G. Lowe, "Object Recognition from Local Scale-Invariant Features", in International Conference on Computer Vision, vol. 2, 1999, pp. 1-8.

K. Mihcak and R. Venkatesan, "Blind Image Watermarking Via Derivation and Quantization of Robust Semi-Global Statistics", in IEEE International Conference on Acoustics, Speech and Signal Processing, 2002, (4 pages).

T. Lindeberg, "Feature Detection with Automatic Scale Selection", International Journal of Computer Vision, vol. 30, No. 2, 1998, pp. 1-51.

A. Andoni and P. Indyk, "Near-Optimal Hashing Algorithms for Approximate Nearest Neighbor in High Dimensions", in Proceedings of the Symposium on Foundations of Computer Science, Jan. 2006, 10 pages.

A. Joly, O. Buisson and C. Frelicot, "Content-based Copy Retrieval using Distortion-based Probabilistic Similarity Search", IEEE Transactions on Multimedia, vol. 9, No. 2, p. 1-14, Feb. 2007.

J. Matas, O. Chum, M. Urban, T. Pajdla, "Robust Wide Baseline Stereo from Maximally Stable Extremal Regions", in British Machine Vision Conference., 2002, pp. 384-393.

K. Mikolajczyk and C. Schmid, "Indexing based on scale invariant interest points", in Proc. ICCV, 2001, 7 pages.

Chinese Patent Application No. 201780011326.6, Office Action dated Mar. 9, 2020, 6 pages.

Chinese Patent Application No. 201780011328.5, Office Action dated Mar. 9, 2020, 8 pages.

\* cited by examiner

```
#EXTM3U
#EXT-X-STREAM-INF:PROGRAM-ID=1,BANDWIDTH=1326000
http://12.34.56.789/server/play/directory/1326000/prog.m3u8
#EXT-X-STREAM-INF:PROGRAM-ID=1,BANDWIDTH=826000
http://12.34.56.789/server/play/directory/826000/prog.m3u8
#EXT-X-STREAM-INF:PROGRAM-ID=1,BANDWIDTH=1926000
http://12.34.56.789/server/play/directory/1926000/prog.m3u8
#EXT-X-STREAM-INF:PROGRAM-ID=1,BANDWIDTH=526000
http://12.34.56.789/server/play/directory/526000/prog.m3u8
```

FIG. 3

```
#EXTM3U
#EXT-X-TARGETDURATION:10
#EXT-X-VERSION:5
#EXT-X-MEDIA-SEQUENCE:1
#EXT-X-KEY:METHOD=SAMPLE-AES,URI="http://www.server.com/keys/ckey/kuxeFdrW8knwGPJ7zDIJ6Q==?anvack=nbcu_n
bcd_watchvod_ios_qa_c23d2809ee27249f2a757537da68d17d",IV=0xE0F48617C6SF9D00ACC4B47D0EDE94B5
#EXTINF:12.512,
http://www.videolocation.com/2288/15/04/24/2861607/227C1D636AE412B0A9CD90ECB9B899BD6A7631282DBF7E-1.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x24BCA9ACCEFA864BFEC75CBED36D47C8
#EXTINF:12.512,
http://www.videolocation.com/2288/15/04/24/2861607/227C1D636AE412B0A9CD90ECB9B899BD6A7631282DBF7E-2.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x6C29CA3D305C63ACEBB7A06EBE3573F7
#EXTINF:12.513,
http://www.videolocation.com/2288/15/04/24/2861607/227C1D636AE412B0A9CD90ECB9B899BD6A7631282DBF7E-3.ts
#EXT-X-KEY:METHOD=SAMPLE-AES,URI="http://www.server.com/keys/ckeys/kuxeFdrW8knwGPJ7zDIJ6Q==?anvack=nbcu_nbcd_wa
tchvod_ios_qa_c23d2809ee27249f2a757537da68d17d",IV=0xC8BDB892FDE40BD0C167C3F10B5D8699
#EXTINF:12.512,
http://www.videolocation.com/2288/15/04/24/2861607/227C1D636AE412B0A9CD90ECB9B899BD6A7631282DBF7E-4.ts
#EXT-X-KEY:METHOD=SAMPLE-AES,URI="http://www.server.com/keys/ckey/kuxeFdrW8knwGPJ7zDIJ6Q==?anvack=nbcu_nbcd_wa
tchvod_ios_qa_c23d2809ee27249f2a757537da68d17d",IV=0x3F9FCC1E55D85CFE32C18BA73992181D
#EXTINF:12.513,
http://www.videolocation.com/2288/15/04/24/2861607/227C1D636AE412B0A9CD90ECB9B899BD6A7631282DBF7E-5.ts
```

FIG. 4

METHOD AND APPARATUS FOR SPATIAL ENHANCED ADAPTIVE BITRATE LIVE STREAMING FOR 360 DEGREE VIDEO PLAYBACK

CROSS-REFERENCE TO RELATED APPLICATIONS

This application claims priority to U.S. provisional application Ser. No. 62/336,823, filed May 16, 2016 and titled Method and Apparatus for Spatial Enhanced Adaptive Bitrate Live Streaming for 360 Degree Video Playback, the entire contents of which is incorporated herein by reference.

BACKGROUND

The subject matter disclosed herein relates to a method of delivering a spatially enhanced live streaming experience for virtual reality or 360 degree live streaming of video. More specifically, a method and apparatus is disclosed for providing 360 degree live streaming of video having multiple streams where spatially different locations in the video are encoded with differing bitrates (resolution) and adaptively selecting a stream where a spatially high resolution encoded area for video data is aligned with a viewer's field of view and where a low resolution encoded area for video data is outside of the viewer's field of view.

Video streaming allows video content to be delivered to a video player via the internet. The video content is a video signal generated by a content provider for distribution to video consumers. The video signal may be provided in an uncompressed file format, such as a serial digital interface (SDI) format, or in a compressed format, such as a Moving Picture Experts Group (MPEG) file format or Transport Stream (TS) file format. The video signal is sent to an encoder which converts the file into a live streaming signal. The live streaming signal is preferably a segmented data stream that may be transmitted using standard Hypertext Transport Protocol (HTTP) over the internet. The live streaming signal may include multiple streams, where each stream may have a different data rate and/or different resolution.

Two common formats for the live streaming signal include HTTP Live Streaming (HLS) implemented by Apple® and MPEG-Dynamic Adaptive bitrate Streaming over HTTP (MPEG-DASH) implemented, for example, by web browsers such as Chrome®, Microsoft Edge®, and Firefox®. In addition to the segmented data stream, the encoder generates a manifest file. The manifest file contains information for a video player to play the segmented data stream such as the data rate and resolution of each stream and a playlist providing an address from which the video content may be retrieved. Historically, the encoder has generated a single manifest file for each enhanced video stream, where the manifest file is distributed along with the streaming signal.

The live streaming signal and the manifest file are stored in one or more Content Delivery Networks (CDN). Each CDN includes a number of edge servers which store the streaming signal and manifest file until requested by a video player. When the streaming signal is provided to multiple CDNs, the CDNs may be in different geographic locations, such as the West Coast, East Coast, or Midwest. Each video player may select a CDN based, among other things, on its geographic proximity in order to reduce transmission latencies.

The video player may be any suitable electronic device to receive the streaming signal such as a desktop computer, a television, a laptop computer, a tablet, or a mobile phone. A user initiates a request to view desired video content on the video player. The video player includes video management software executing on the video player which has knowledge of the address of the CDN and which may provide a list of video content stored on the CDN to the user. After the user has selected a desired video, the video player, in turn, requests that the video content be transmitted from the CDN.

For a traditional two dimensional (2D) live streaming video, the viewpoint of the video is dictated by the orientation of the camera capturing the video. In a production video, such as a movie or an episode of a television show, many cameras and, therefore, multiple viewpoints may be available. However, the director selects a single viewpoint at each instant in time and edits the various viewpoints into a single stream, where the action at any point in time is viewed from the angle selected by the director. Further, the 2D live streaming video is intended for passive playback on a screen without interaction from the user viewing the video. Each viewer receiving the streaming video receives the same video and the same playback experience.

In contrast, the playback experience with virtual reality or 360 degree video is dictated, at least in part, by the viewer. Video content may be captured, for example, by a single 360 degree camera or by multiple traditional cameras at different viewpoints or the video content may be computer generated. In either instance, video information is required for all potential viewpoints of a viewer. In other words, if a viewer looks left or right, up or down, or to the rear, video information must be available to provide an image to the viewer. Thus, at any given time only a portion of the video information being provided to the viewer is displayed to the viewer. Another portion of the video information is being transmitted to the display device to be available if the viewer changes the point of view. Because the direction the viewer will look cannot be predicted, the content for every direction must be available for display. As a result, the volume of video information to be transmitted increases significantly over a traditional 2D live streaming video. Further, if the video is being provided to stereoscopic virtual reality display device, the live stream information is approximately doubled as a separate stream is provided for viewing by each eye. The increased video content requires a corresponding increase in bandwidth to deliver 360 degree streaming video.

Thus, it would be desirable to provide a system for streaming video to a 360 degree or virtual reality video player with reduced bandwidth requirements for an enhanced playback experience.

BRIEF DESCRIPTION

The subject matter disclosed herein describes a system for streaming video to a 360 degree or virtual reality video player with reduced bandwidth requirements for an enhanced playback experience. The system includes an apparatus and method for delivering a spatially enhanced live streaming experience for virtual reality or 360 degree live streaming of video. An encoder receives an input video signal for delivery to viewers. The encoder converts the input video signal into a number of streams at varying resolutions similar to traditional live streaming. The encoder then generates a number of spatially enhanced streams. Each spatially enhanced stream includes a segment of high resolution video stream, corresponding to a field of view from within the entire 360 video stream, merged with a low resolution video stream. The spatially enhanced streams are delivered to a Content Delivery Network (CDN) for subsequent retrieval by the 360 degree video player. The 360 degree video player selects one of the spatially enhanced streams for playback based on the direction in which the viewer is looking.

According to one embodiment of the disclosure, a method for providing spatial adaptive enhanced video streams for playback of a 360 degree video signal is disclosed. At least two streaming video signals corresponding to the 360 degree video signal are generated. A first streaming video signal has a first resolution, and a second streaming video signal has a second resolution, where the second resolution is lower than the first resolution. Each of the first and second streaming video signals includes a plurality of frames, and each frame spans a 360 degree viewing angle. Each frame of the first and second streaming video signals are divided into multiple segments, and each of the segments spans a portion of the 360 degree viewing angle. Multiple enhanced video streams are generated. Each of the enhanced video streams includes a plurality of frames, and each frame in one of the enhanced video streams includes at least one segment from one of the frames in the first streaming video signal and at least one segment from one of the frames in the second streaming video signal.

According to another aspect of the disclosure, each frame in the plurality of enhanced video streams includes a plurality of segments, and the plurality of segments in each frame in the plurality of enhanced video streams combine to span the 360 degree viewing angle. One of the plurality of segments in each frame in the plurality of enhanced video streams is from the first streaming video signal, and each of the other segments in each frame in the plurality of enhanced video streams is from the second streaming video signal.

According to yet another aspect of the disclosure, a manifest file for the 360 degree video signal may be generated with the encoder. The manifest file includes a first identifier and a second identifier for each of the plurality of enhanced video streams corresponding to the 360 degree video signal. The first identifier defines an address at which the enhanced video stream is stored, and the second identifier defines a direction corresponding to the portion of the 360 degree viewing angle spanned by the segment from the first streaming video signal.

According to still another aspect of the disclosure, generating at least two streaming video signals may include receiving a spherical 360 degree video signal at the encoder, mapping the spherical 360 degree video signal to an intermediate video signal in a representative space, and converting the intermediate video signal to the at least two streaming video signals with the encoder.

According to still other aspects of the disclosure, at least one additional streaming video signal may be generated, where each additional streaming video signal has a resolution different than the first resolution and the second resolution. The portion of the 360 degree viewing angle spanned by each of the plurality of segments in the first streaming video signal and in the second streaming video may be an equal number of degrees of the 360 degree viewing angle. Optionally, the first streaming video signal may be divided into a first set of segments and a second set of segments, and the second streaming video signal may be divided into a third set of segments and a fourth set of segments, where the first set of segments corresponds to the third set of segments and the second set of segments corresponds to the fourth set of segments. Each of the first and third set of segments spans a first viewing angle which is different than and offset from a second viewing angle spanned by each of the second and fourth set of segments. The number of degrees of the offset is less than the number of degrees spanned by the first and second viewing angles.

According to another embodiment of the disclosure, a system for providing spatial adaptive enhanced video streams for playback of a 360 degree video signal is disclosed. The system includes an encoder having an input operative to receive the 360 degree video signal, a non-transitory memory operative to store a plurality of instructions, and a processor operative to execute the stored instructions. The processor executes the stored instructions to generate at least two streaming video signals corresponding to the 360 degree video signal. A first streaming video signal has a first resolution, and a second streaming video signal has a second resolution lower than the first resolution. Each of the first and second streaming video signals includes a plurality of frames, and each frame spans a 360 degree viewing angle. The processor also executes to divide each frame of the first and second streaming video signals into multiple segments, where each of the segments spans a portion of the 360 degree viewing angle. The processor further executes to generate multiple enhanced video streams, where each of the enhanced video streams includes a plurality of frames. Each frame in one of the enhanced video streams includes at least one segment from one of the frames in the first streaming video signal and at least one segment from one of the frames in the second streaming video signal.

According to still another embodiment of the disclosure, a method for displaying a spatial adaptive enhanced video stream for playback of a 360 degree video signal is disclosed. The 360 degree video signal has a 360 degree viewing angle. A request to view the 360 degree video signal is transmitted to a manifest server from a video player, and a manifest file, corresponding to the 360 degree video signal, is received at the video player from the manifest server. The manifest file includes a plurality of first and second identifiers. Each first identifier defines an address at which one of a plurality of enhanced video streams is stored and each enhanced video stream includes a plurality of frames. Each frame in each enhanced video stream includes at least one segment from a first streaming video signal and at least one segment from a second streaming video signal. The first streaming video signal is generated from the 360 degree video signal at a first resolution, and the second streaming video signal is generated from the 360 degree video signal at a second resolution less than the first resolution. Each second identifier defines a direction within one of the enhanced video streams corresponding to a portion of the 360 degree viewing angle spanned by the at least one segment from the first streaming video signal. One of the plurality of enhanced video streams is read from the address at which it is stored as a function of a desired direction of viewing within the 360 degree video signal corresponding to the direction in one of the plurality of second identifiers.

According to another aspect of the disclosure, an input signal may be received at the video player from a direction interface, where the input signal corresponds to the desired direction of viewing within the 360 degree video signal. The plurality of second identifiers are read to identify the enhanced video stream with the at least one segment from the first streaming video signal in the direction corresponding to the desired direction of viewing, and the address is read from the plurality of first identifiers for the identified enhanced video stream. The video player may receive the input signal from the direction interface at a periodic interval and read a new address from the plurality of first identifiers for each identified enhanced video stream. The video player may play back a first segment of the 360 degree video signal from a first enhanced video stream, corresponding to a first desired direction of viewing, and a second segment of the 360 degree video signal from a second enhanced video stream, corresponding to a second desired direction of viewing.

These and other objects, advantages, and features of the disclosure will become apparent to those skilled in the art from the detailed description and the accompanying drawings. It should be understood, however, that the detailed description and accompanying drawings, while indicating preferred embodiments of the present disclosure, are given by way of illustration and not of limitation. Many changes and modifications may be made within the scope of the present disclosure without departing from the spirit thereof, and the disclosure includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which:

FIG. 3 is a segment of a manifest file describing the bandwidths of the available streams for the streaming video content and the location of each stream;

FIG. 4 is a segment of a manifest file including a portion of a playlist where the video content is encrypted;

Figure 1:
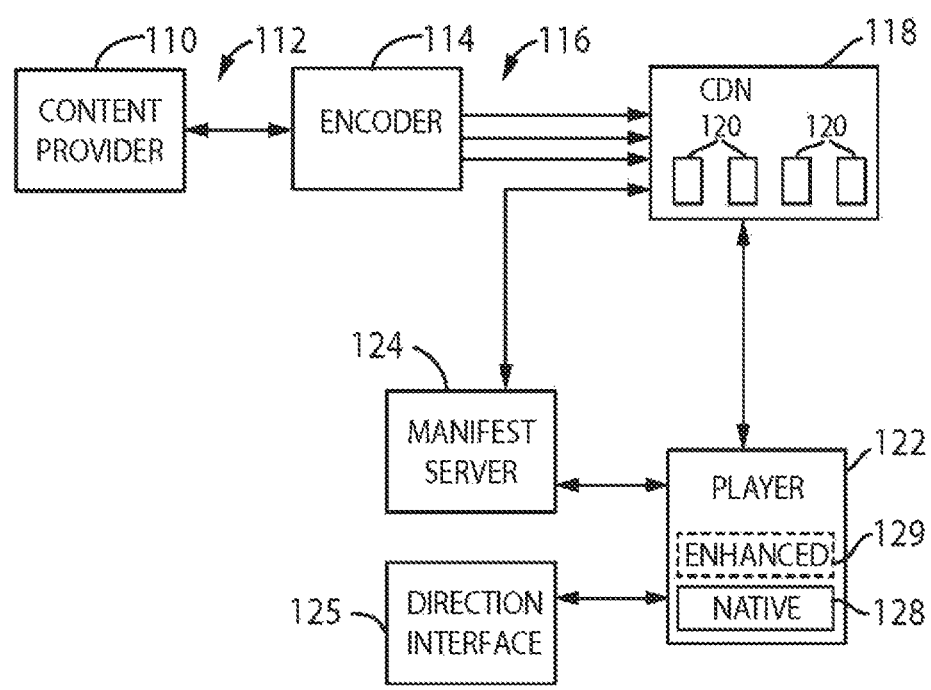
FIG. 1 is a block diagram representation of an environment incorporating the method for streaming video to a 360 degree or virtual reality video player according to one embodiment of the disclosure.

In describing the preferred embodiments of the disclosure which are illustrated in the drawings, specific terminology will be resorted to for the sake of clarity. However, it is not intended that the disclosure be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, one environment for providing streaming video to a 360 degree or virtual reality video player 122 with reduced bandwidth requirements is illustrated. A content provider 110 generates a 360 degree video signal 112 to be distributed to video consumers. The 360 degree video signal 112 includes video content for the entire spherical video stream. The 360 degree video signal may be captured from a 360 degree camera and transmitted directly to the encoder 114.

According to one embodiment, the content provider 110 transmits a spherical 360 degree video signal 112 to the encoder 114. The 360 degree camera captures video signal from all directions (i.e., up, down, front, back, and side-to-side) and generates the spherical 360 degree video signal 112. The encoder 114 may convert the spherical signal to an intermediate signal using a representative video space for the 360 degree signal. The representative video space may be an equirectangular layout, in which each frame of the video signal is flattened from a sphere around the viewer onto a two dimensional surface, or a cube or pyramid model, in which the spherical video signal is placed within a cube or pyramid and projected onto the surfaces of the cube or pyramid.

According to another embodiment, the content provider 110 may convert the spherical 360 degree video signal into an intermediate signal in a representative video space prior to transmitting the signal to the encoder 114. It is contemplated that the present disclosure may be utilized with 360 degree video signals 112 presented in spherical format, equirectangular format, or in other formats, including but not limited to the cube model or the pyramid mapping model, without deviating from the scope of the disclosure. For purposes of illustration of the present disclosure, the video signal 112 sent to the encoder 114 will be discussed as an equirectangular layout in which each frame of the video signal is flattened from a sphere around the viewer onto a two dimensional surface.

Figure 5A:
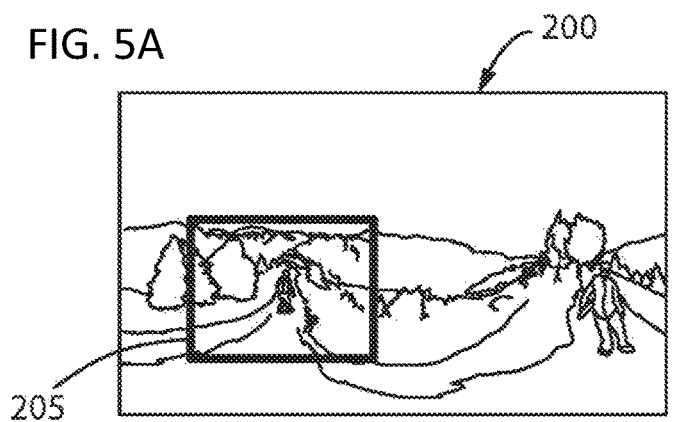
FIG. 5A is 360 degree video signal to generate an equirectangular view in a first direction.
Figure 6A:
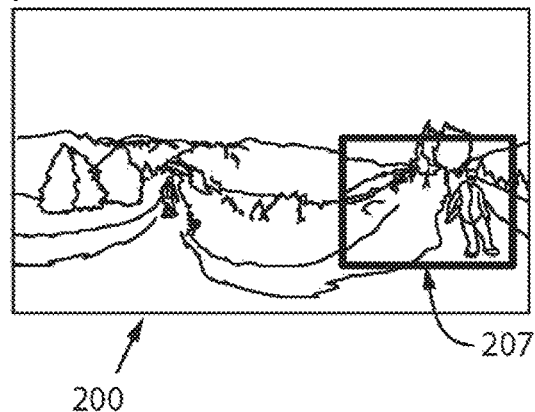
FIG. 6A is 360 degree video signal to generate an equirectangular view in a second direction.

With reference to FIG. 5a or 6a, a representative equirectangular frame from the 360 degree video signal is illustrated. The frame has a 360 degree field of view and contains the entire content of an image for playback on a 360 degree video player 122. When played back on a 360 degree video player 122, portions of the frame are projected in front of the user and, depending on the video player 122, portions of the frame may be projected on a viewing screen above, below, or to the side of a user's field of view. As the head of a user turns, a direction interface 125 connected to the video player 122 detects the movement and generates a signal corresponding to the direction in which the user is looking. The desired direction is selected from the 360 degree field of view and projected in front of the user with other portions of the frame projected above, below, or to the side of the user's field of view according to the specifications of the 360 degree video player 122.

The encoder 114 converts the 360 degree video signal 112 into live streaming video signals 116 for use by the video player 122. Historically, the encoder 114 converts an input video signal into a number of streaming video signals where each streaming video signal may be a different resolution. The video player 122 may select one of the streaming video signals according to the bandwidth of the connection between the video player 122 and the content delivery network 118. While high resolution playback is typically desired, the greater the resolution the greater the bandwidth required and resolution may be limited according to the available bandwidth between the video player 122 and the content delivery network 118.

According to the present disclosure, the encoder 114 further generates multiple, spatially enhanced video streams 116 from the streaming video signals at varying resolutions. Each streaming video signal includes a sequence of frames. A representative equirectangular frame from the 360 degree video signal at full resolution is illustrated in FIGS. 5a and 6a. It is contemplated that one of the streaming video signals may be generated at full resolution. Other streaming video signals may be generated at lower resolutions for transmission at lower bandwidths. According to one method of converting the full resolution signal to a lower resolution signal, each frame from the full resolution signal is converted to a frame having a lower resolution.

In order to further reduce the bandwidth of the streaming video signal, a portion of the frames may dropped. For example, the frame rate may be reduced by half by dropping every other frame when converting to a lower resolution and each frame played back for a duration twice the length of the original frame. It is contemplated that still other methods of reducing bandwidth for the lower resolution video streams may be utilized without deviating from the scope of the disclosure.

Each frame in the streaming video signals at the different resolutions are divided into multiple segments. For purposes of illustration, each streaming video signal may be divided into four segments, where each segment has a ninety degree field of view. As illustrated in FIGS. 7A-7D and 8A-8D, each frame from the streaming video signals is divided into four segments corresponding to ninety degree intervals of the video signal 112. In a first embodiment, shown in FIGS. 7A-7D, the four segments are taken at ninety degree intervals starting at zero degrees, and in a second embodiment, shown in FIGS. 8A-8D, the four segments are taken at ninety degree intervals starting at forty-five degrees. It is contemplated that differing numbers of segments with a corresponding different field of view may be utilized without deviating from the scope of the disclosure. For example, the 360 degree video signal 112 may be divided into other equal segments including, but not limited to three, five, or six segments.

Figure 7A:
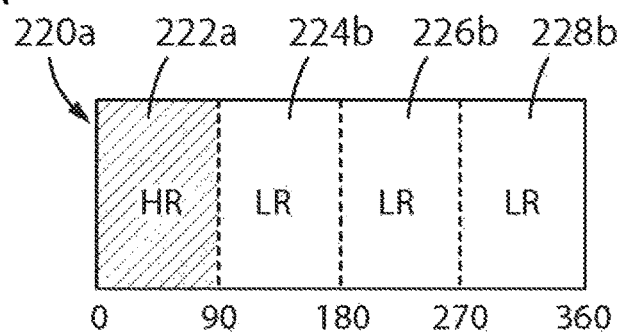
FIG. 7A is a graphical representation of a 360 degree video frame shown as an equirectangular image, where zero to ninety degrees is in high resolution and the remainder is in low resolution.
Figure 7B:
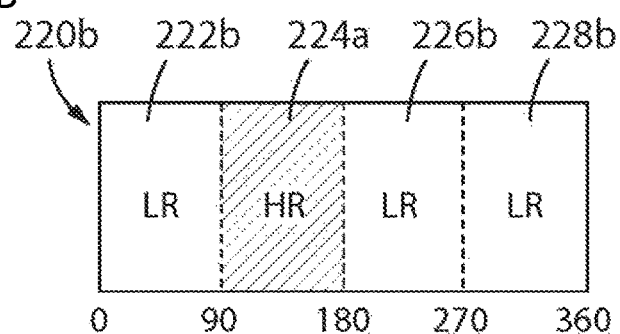
FIG. 7B is a graphical representation of a 360 degree video frame shown as an equirectangular image, where ninety to one hundred eighty degrees is in high resolution and the remainder is in low resolution.
Figure 7C:
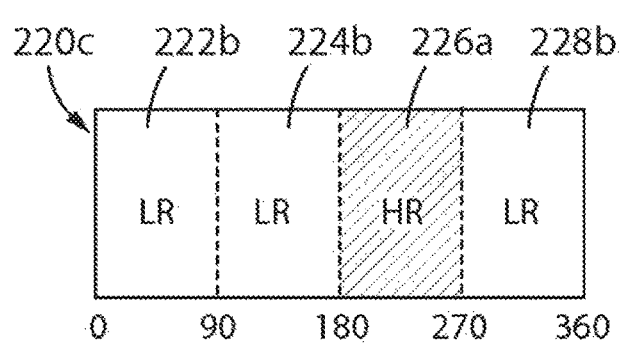
FIG. 7C is a graphical representation of a 360 degree video frame shown as an equirectangular image, where one hundred eighty to two hundred seventy degrees is in high resolution and the remainder is in low resolution.
Figure 7D:
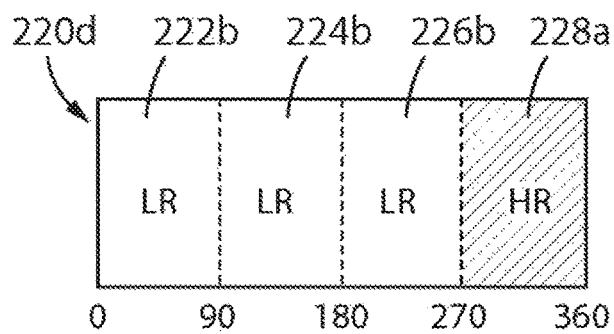
FIG. 7D is a graphical representation of a 360 degree video frame shown as an equirectangular image, where two hundred seventy degrees to three hundred sixty is in high resolution and the remainder is in low resolution.

With reference also to FIGS. 7A-D and 8A-D, each frame 220 in a spatially enhanced view stream includes segments of frames from at least two video streams at different resolutions. Turning initially to FIGS. 7A-7D, a first frame 220a for a first spatially enhanced view stream is illustrated in FIG. 7A; a first frame 220b for a second spatially enhanced view stream is illustrated in FIG. 7B; a first frame 220c for a third spatially enhanced view stream is illustrated in FIG. 7C; and a first frame 220d for a fourth spatially enhanced view stream is illustrated in FIG. 7D. In the frame 220a for the first spatially enhanced view stream, a high resolution (HR) first segment 222a is taken from a high resolution live video stream generated by the encoder 114, where the high resolution first segment 222a spans from zero degrees to ninety degrees. The first frame 220a for the first spatially enhanced view stream also includes three low resolution (LR) segments (i.e., a low resolution second segment 224b, a low resolution third segment 226b, and a low resolution fourth segment 228b). Each of the low resolution segments are taken from a low resolution live video stream generated by the encoder 114. The four segments are combined to generate the single frame of the first spatially enhanced view stream such that the segments combine to cover the entire 360 degree field of view of the original frame. Each additional frame in the first spatially enhanced view stream is generated in a similar manner to create a first spatially enhanced view stream having high resolution content from zero to ninety degrees.

The first frame 220b for the second spatially enhanced view stream includes one high resolution segment and three low resolution segments. In the first frame 220b for the second spatially enhanced view stream, a high resolution second segment 224a is taken from the high resolution live video stream generated by the encoder 114, where the high resolution second segment 224a spans from ninety degrees to one hundred eighty degrees. The first frame 220b for the second spatially enhanced view stream also includes three low resolution (LR) segments (i.e., a low resolution first segment 222b, a low resolution third segment 226b, and a low resolution fourth segment 228b). Each of the low resolution segments are taken from a low resolution live video stream generated by the encoder 114. The four segments are combined to generate a single frame of the second spatially enhanced view stream such that the segments combine to cover the entire 360 degree field of view of the original frame. Each additional frame in the second spatially enhanced view stream is generated in a similar manner to create a second spatially enhanced view stream having high resolution content from ninety to one hundred eighty degrees.

The first frame 220c for the third spatially enhanced view stream includes one high resolution segment and three low resolution segments. In the first frame 220c for the third spatially enhanced view stream, a high resolution third segment 226a is taken from the high resolution live video stream generated by the encoder 114, where the high resolution third segment 226a spans from one hundred eighty to two hundred seventy degrees. The first frame 220c for the third spatially enhanced view stream also includes three low resolution (LR) segments (i.e., a low resolution first segment 222b, a low resolution second segment 224b, and a low resolution fourth segment 228b). Each of the low resolution segments are taken from the low resolution live video stream generated by the encoder 114. The four segments are combined to generate a single frame of the third spatially enhanced view stream such that the segments combine to cover the entire 360 degree field of view of the original frame. Each additional frame in the third spatially enhanced view stream is generated in a similar manner to create a third spatially enhanced view stream having high resolution content from one hundred eighty to two hundred seventy degrees.

The first frame 220d for the fourth spatially enhanced view stream includes one high resolution segment and three low resolution segments. In the first frame 220d for the fourth spatially enhanced view stream, a high resolution fourth segment 228a is taken from the high resolution live video stream generated by the encoder 114, where the high resolution fourth segment 228a spans from two hundred seventy to three hundred sixty degrees. The first frame 220d for the fourth spatially enhanced view stream also includes three low resolution (LR) segments (i.e., a low resolution first segment 222b, a low resolution second segment 224b, and a low resolution third segment 226b). Each of the low resolution segments are taken from a low resolution live video stream generated by the encoder 114. The four segments are combined to generate a single frame of the fourth spatially enhanced view stream such that the segments combine to cover the entire 360 degree field of view of the original frame. Each additional frame in the fourth spatially enhanced view stream is generated in a similar manner to create a fourth spatially enhanced view stream having high resolution content from two hundred seventy to three hundred sixty degrees.

Turning next to FIGS. 8A-8D, first frames (220e-220h) for four additional enhanced video streams are illustrated. Each of the first frames (220e-220h) are generated by the encoder in a manner similar to that discussed above with respect to FIGS. 7A-7D. Four additional segments are selected from each of the high and low resolution video streams. A high resolution fifth segment 232a and a low resolution fifth segment 232b each span from forty-five to one hundred thirty-five degrees. A high resolution sixth segment 234a and a low resolution sixth segment 234b each span from one hundred thirty-five to two hundred twenty-five degrees. A high resolution seventh segment 236a and a low resolution seventh segment 236b each span from two hundred twenty-five to three hundred fifteen degrees. A high resolution eighth segment 238a and a low resolution eighth segment 238b each span from three hundred fifteen degrees to three hundred sixty degrees and wrap around from zero degrees to forty-five degrees. A fifth, sixth, seventh, and eighth enhanced view stream each include one segment from the high resolution video stream and three segments from the low resolution video stream to generate four additional spatially enhanced view streams, where the spatially enhanced view streams in FIGS. 8A-8D are offset from the spatially enhanced view streams in FIGS. 7A-7D by forty-five degrees.

According to another embodiment of the disclosure, it is contemplated that the 360 degree video 112 may be divided into all eight video streams represented by FIGS. 7A-7D and 8A-8D. Eight 90 degree segments of the original frame are generated, where the start of each segment is 45 degrees apart. The first high resolution segment spans from zero to ninety degrees, the second high resolution segment spans from forty-five to one hundred thirty-five degrees, and etc. . . . Each of the enhanced view streams is combined into a stream for adaptive spatial playback on the video player 122. The video player may then select one of the video streams that most closely correlates to the direction of viewing. Although the video streams generated by the encoder 114 from the original 360 degree video signal 112 are referred to herein as high and low resolution, the terms high and low are intended to be relative to each other. In other words, the high resolution video stream has a resolution greater than the low resolution video stream. It is contemplated that the encoder 114 may generate three or more video streams at varying levels of resolution. According to one embodiment, segments of frames from any two of the three or more video streams may be combined to form an enhanced video stream. Optionally, segments of frames from three or more video streams may be combined to form an enhanced video stream where the resolution of the video stream from which high resolution segments are selected is higher than the resolution in each of the other streams.

According to still another embodiment, the encoder 114 may generate two sets of spatially enhanced video streams from three or more video streams where the same fields of view for segments are used in each of the enhanced video streams. A first spatially enhanced video stream may select a video stream having the highest resolution as the high resolution video stream used and a second enhanced video stream may select a different video stream having the next highest resolution as the high resolution video stream used. Both of the first and second enhanced video streams may select the same video stream having the lowest resolution as the low resolution video stream used. In this manner the encoder may generate multiple spatially enhanced video streams having the same field of view for the high resolution content but having different bandwidths for playback by the video player 122.

The encoder 114 further converts each spatially enhanced video stream into a live streaming signal 116. The live streaming signal 116 is preferably a segmented data stream that may be transmitted using standard HTTP or HTTPS protocol over the internet. The format of the live streaming signal may be, but is not limited to, HLS or MPEG-DASH. Still other protocols such as HTTP Dynamic Streaming (HDS) from Adobe® or Microsoft® Smooth Streaming and the like may be used without deviating from the scope of the disclosure.

In addition to the segmented data stream, the encoder generates a manifest file. The manifest file contains information for a video player 122 to play the segmented data stream such as the data rate and resolution of each stream and a playlist providing an address from which the video content may be retrieved. The encoder also inserts an identifier for each spatially enhanced video stream 116 identifying which segment and, in turn, which direction has the high resolution video stream.

The encoder 114 generates a single manifest file for each enhanced video stream, where the manifest file is distributed along with the streaming signal 116 and stored on a CDN 118. It is noted that the "single" manifest file refers to a common or identical manifest file for each encoded signal. The manifest file may be comprised of multiple data files stored on the CDN where each manifest file contains a portion of the data required to playback the streaming signal. Further, for live streaming video, the manifest file may be updated and retransmitted at a periodic interval as new content is added from the live event. Although multiple files are used, the content generated by the encoder 114 for delivery to each video player 122 is the same. Each CDN 118 includes a number of edge servers 120 which store the enhanced video stream 116 and manifest file until playback of the video content is requested by a video player 122. Although the embodiment illustrated in FIG. 1 shows a single CDN 118, it is contemplated that the enhanced video stream 116 may be stored on multiple CDNs 118. The manifest file may include an address of each CDN such that playback may occur from any of the CDNs 118.

As further illustrated in FIG. 1, the illustrated environment includes a manifest server 124. The manifest server 124 is used to provide a unique manifest file, also referred to herein as a per-user manifest file, to each video player 122 for each requested video content. Each video player 122 includes a native video player module 128 which provides an interface to a user and which manages video playback on the device 122. Some video players 122 may further include an enhanced video player module 129, illustrated as an optional module in FIG. 1. The enhanced video player module 129 may be a plug-in or other software module executing on the video player 122 that either complements (i.e., adds additional capabilities) or replaces (i.e., adds additional capabilities and incorporates the video interface and playback capabilities) the native video player module 128. As will be discussed in more detail below, when a user requests video content for playback on the video device 122, the native or enhanced video player module 129 communicates with a manifest server 124 rather than the CDN 118 to obtain the manifest files for video playback. The manifest server 124 manages the retrieval and delivery of the manifest file generated by the encoder 114 to provide the unique manifest file to each video player 122.

With a video player 122 configured to playback 360 degree live video, a direction interface 125 is provided. A viewer uses the direction interface to provide an indication to the video player 122 of which direction within the 360 video the viewer would like to see. If the video player 122 is a virtual reality device to be worn by the viewer, a gyroscope may be included within the virtual reality device. The gyroscope generates a signal corresponding to rotation about the axis of the gyroscope. As a viewer turns to look at different segments of the 360 degree video, the gyroscope generates a signal corresponding to the movement of the viewer and the virtual reality device identifies which segment of the 360 degree video should be displayed to the viewer. In other 360 degree viewers, the direction interface 125 may be, for example, a touch screen, a mouse, a trackball, arrow keys and the like to receive an indication of a direction in which the viewer wants to look.

Figure 5B:
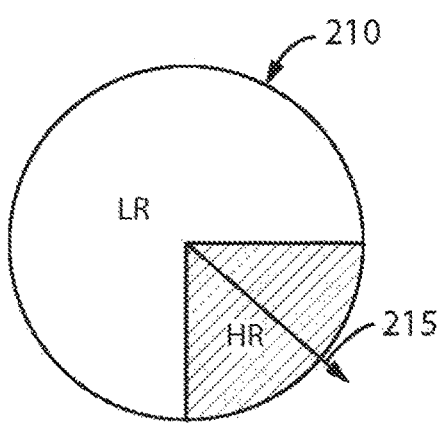
FIG. 5B is an indication of a first desired field of view in a first direction.
Figure 5C:
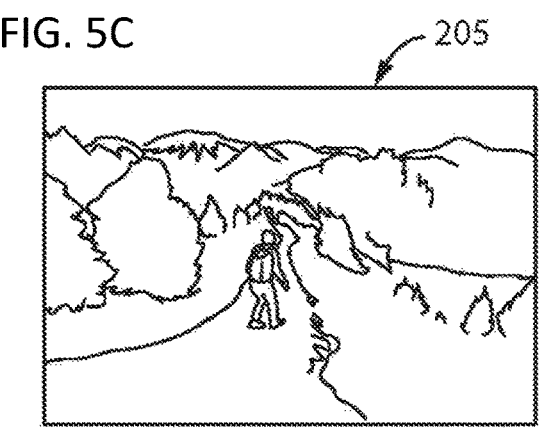
FIG. 5C is an indication of the view generated from the 360 degree video signal in the first direction.
Figure 6B:
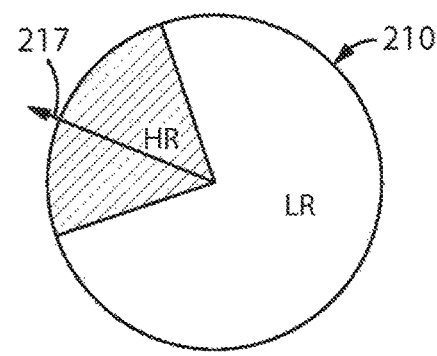
FIG. 6B is an indication of a second desired field of view.
Figure 6C:
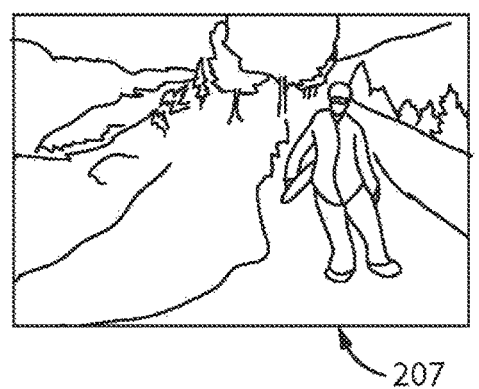
FIG. 6C is an indication of the view generated from the 360 degree video signal in the second direction.

Based on the direction in which the viewer wants to look, at least a portion of the enhanced video stream in the desired direction is displayed to the viewer. With reference next to FIGS. 5A-5C and 6A-6C, a single frame 200 of the original video stream 112 is shown in both FIG. 5A and FIG. 6A, where a first desired direction for viewing is illustrated in FIGS. 5A-5C and a second desired direction for viewing is illustrated in FIGS. 6A-6C. In each instance, the entire frame 200 is shown in a single resolution. However, in FIGS. 5A-5C, a first field of view 205 is the desired direction for viewing and, in FIGS. 6A-6C, a second field of view 207 is the desired direction for viewing. As shown, each frame 200 of the original video stream 112 includes high resolution content across the entire 360 degree field of view. In the two illustrations, the first field of view 205 is approximately 180 degrees opposite the second field of view 207. A reference circle 210 in FIG. 5B or FIG. 6B illustrates the entire 360 degree field of view. A first direction 215 corresponds to the desired direction for viewing in FIGS. 5A-5C and a second direction 217 corresponds to the desired direction for viewing in FIGS. 6A-6C. The resulting image to be displayed to the viewer is shown in FIG. 5C and FIG. 6C for the first direction 215 and the second direction 217, respectively.

Figure 8A:
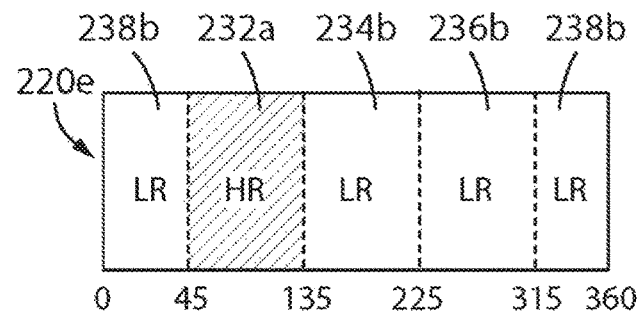
FIG. 8A is a graphical representation of a 360 degree video frame shown as an equirectangular image, where forty-five to one hundred thirty-five degrees is in high resolution and the remainder is in low resolution.
Figure 8B:
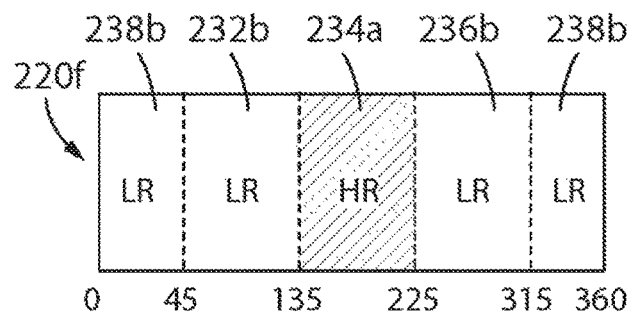
FIG. 8B is a graphical representation of a 360 degree video frame shown as an equirectangular image, where one hundred thirty-five to two hundred twenty-five degrees is in high resolution and the remainder is in low resolution.
Figure 8C:
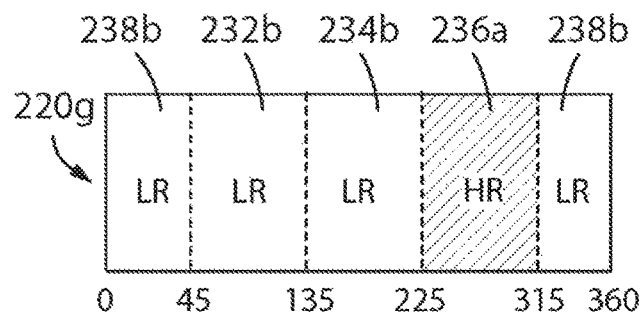
FIG. 8C is a graphical representation of a 360 degree video frame shown as an equirectangular image, where two hundred twenty-five to three hundred fifteen degrees is in high resolution and the remainder is in low resolution.
Figure 8D:
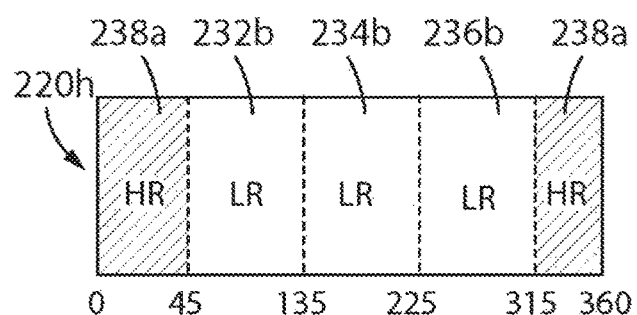
FIG. 8D is a graphical representation of a 360 degree video frame shown as an equirectangular image, where the high resolution segment begins at three hundred fifteen degrees, wraps around at three hundred sixty degrees, and spans to forty-five degrees and the remainder is in low resolution.

In each instance, a ninety degree field of view in the desired direction is illustrated. Thus, enhanced video streams having 4 segments could be transmitted to the video player 122 to play back the image. With reference also to FIG. 7B, an enhanced video stream having a high resolution segment spanning from ninety to one hundred eighty degrees could be read by the video player to display the desired field of view 205 for the first direction 215 illustrated in FIGS. 5A-5C. With reference also to FIG. 8C, an enhanced video stream having a high resolution segment spanning from two hundred twenty-five to three hundred fifteen degrees could be read by the video player to display the desired field of view 207 for the second direction 217 illustrated in FIGS. 6A-6C. As will be discussed further below, as the desired direction changes, the video player 122 receives a signal corresponding to the desired direction and, based on the information stored in the manifest file, identifies a spatially enhanced video stream in which the high resolution segment corresponds to the desired direction. The video player 122 reads the manifest file to obtain the address at which the enhanced video stream is stored and plays back the enhanced video stream corresponding to the desired direction for viewing.

Figure 2:
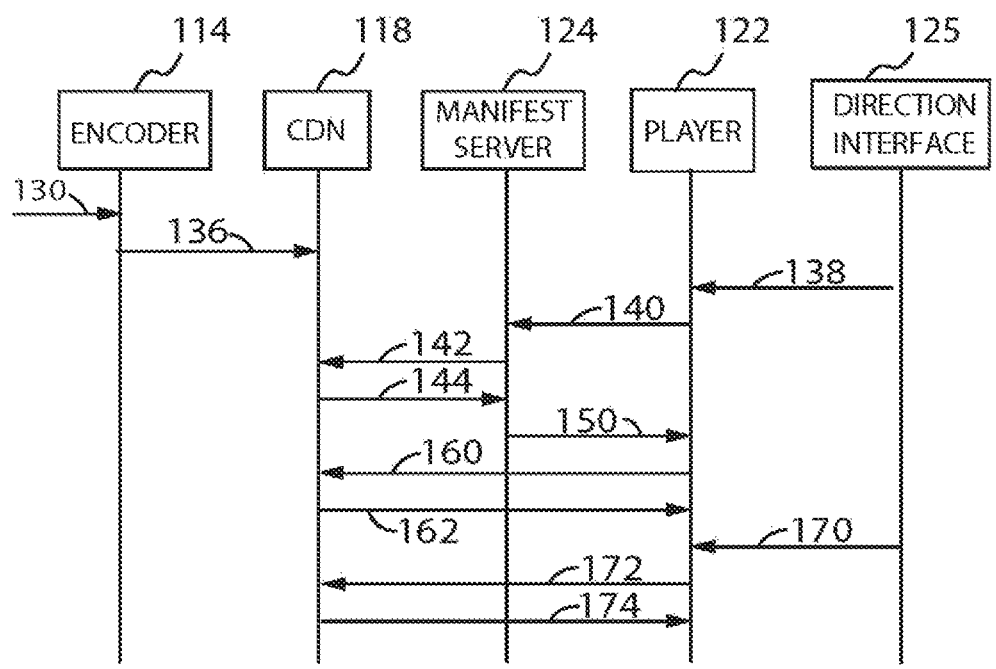
FIG. 2 is a flow diagram illustrating the streaming of a video to a 360 degree or virtual reality video player with reduced bandwidth requirements according to one embodiment of the disclosure.

Turning next to FIG. 2, the operations performed to create, deliver, and playback a 360 degree video stream are illustrated. At block 130, the encoder 114 receives the initial 360 degree video signal 112. It is contemplated that this 360 degree video signal 112 may be a pre-recorded signal or the video signal 112 may be a live stream. The encoder 114 converts the original video signal, as discussed above, into a live streaming signal 116 suitable for delivery via HTTP or HTTPS. The live streaming signal 116 and manifest file are stored on the CDN 118 for playback.

At block 138, a user requests playback of a desired 360 degree video on the video player 122. Within block 138, an initial direction for a desired field of view is provided to the video player 122. The initial direction of the desired field of view may be a default direction or may be selected by the user. At block 140, the video player 122 requests a manifest file from the manifest server 124 in order to retrieve the information necessary to play the requested video content.

With reference also to FIGS. 3 and 4, segments of manifest files are illustrated that illustrate a portion of the content that may be available in a manifest file. The manifest file is a text file and the particular content on each line of the text file is identified by the directive at the start of the line. For example, FIG. 3 identifies four different streams in the streaming signal 116 where each stream has a different bandwidth. The location of a playlist for each of the streams is also included in the manifest file. For the 360 degree live streaming signal 116, the manifest file may further include a first identifier containing the address of each of the enhanced view streams and a second identifier corresponding to the direction for the high resolution content within each of the enhanced view streams.

FIG. 4 is another manifest file which contains a portion of the playlist of an encrypted video segment. Each line begins with the location of the key server to decrypt the video segment, identifies a particular video segment between 1 and 5 (i.e., the "4", "-2", etc. . . . prior to the .ts file extension), and provides the address for the video segment in the CDN 118. The manifest file may include any information corresponding to the video stream, such as metadata information for the video stream.

When the video player 122 requests the manifest file from the manifest server 124 a connection is established between the devices. A session identifier is also generated to identify the connection. The session identifier may be generated by the video player 122 or the manifest server 124. For purposes of illustration, it will be assumed that the session identifier is generated by the video player 122. The session identifier is transmitted to the manifest server 124 by the video player 122 when requesting a manifest file. The manifest server 124 then requests the manifest file from the CDN 118 at block 142. At block 144, the CDN 118 returns the manifest file to the manifest server 124.

Because the manifest server 124 has established a connection with video player 122, it may customize the manifest file prior to returning the manifest file to the video player 122 and provide a unique manifest file to each video player 122. Without the manifest server 124, the video player 122 retrieves the manifest file directly from the CDN 118 and the content of the manifest file is the same for all users. Optionally, the manifest server 124 may provide the original manifest file without modification to the video player 122. The manifest server 124 provides a manifest file to the video player 122 at block 150.

The video player 122 can then start retrieving the video content from the CDN 118. As discussed above, different enhanced video streams have different segments with high resolution video content. The manifest file identifies each stream and the direction within the stream corresponding to the high resolution content. The video player uses the direction signal from the direction interface 125 identifying the desired direction in which a viewer is looking and compares the signal to the identifiers in the manifest file. Using the enhanced video stream with a direction most closely matching the direction in which the viewer is looking, the video player 122 starts reading the enhanced video stream and then repeatedly requests the successive segments of the enhanced video stream, as identified in the playlist, from the CDN 118 as shown in block 160. In block 162, the CDN returns the requested enhanced video stream segment containing a high resolution image in the desired direction of viewing. The native video player module 128 then decodes the content from the encrypted video segments and displays the requested video content to the user.

The video player 122 continually requests the enhanced video stream corresponding to the direction in which the viewer is looking throughout playback of the requested video content. As shown in block 170, the direction interface 125 may indicate to the video player 122 that the viewer has changed the desired direction for the field of view. The enhanced video player module 129 may identify that the desired direction of viewing more closely corresponds to the direction of high resolution content within another enhanced video stream. The video player 122 then begins requesting the next segment of the video content from the CDN 118 using the newly identified enhanced video stream based on the direction and address information stored in the manifest file. Thus, playback of the video signal 112 may seamlessly switch between spatially enhanced video streams 116 based on the direction signal generated by the direction interface 125. The video player 122 continues to request successive video segments in the new stream from the CDN 118 and the CDN returns the requested segment as shown by blocks 172 and 174. An enhanced video stream with high resolution content in the desired direction of viewing but with low resolution content elsewhere is continuously provided for playback, reducing the bandwidth requirements for streaming the 360 degree video signal to the video player 122.

It is contemplated that direction in which the viewer is looking may not coincide directly with one of the segments of high resolution video content of an enhanced view stream. The enhanced video player module 129 may be further configured to identify one of the enhanced view streams that best corresponds to the desired direction of view. According to one embodiment of the disclosure, the enhanced video player module 129 may identify the enhanced view stream that best corresponds to the desired direction of view and direct the video player 122 to retrieve that video stream. According to another embodiment of the disclosure, the enhanced video player module 129 may be configured to act as a proxy server and read multiple video streams. For example, the desired direction of view may overlap the high resolution content of two enhanced view streams. The enhanced video player module 129 may read both enhanced view streams and merge the high resolution sections of both streams prior to providing the resultant stream to the video player 122. The resultant stream may, for example, include high resolution content over 180 degrees and low resolution content over the remaining 180 degrees.

During playback, a user may be continually changing the direction in which they are looking, depending on the content of the video. Therefore, buffering a large content of the video stream in any given direction at the video player 122 is not practical. Rather, a particular enhanced video stream may be read from the CDN, for example, in one second increments. Depending on the bandwidth of the network connection and the processing capability of the video player 122 it may be desirable to buffer the streams in other increments. However, if the duration is too short, it may result in obtaining content from the wrong direction or at the wrong resolution. If the duration is too long, buffering of the video stream may result, resulting in undesirable pauses in the playback.

Portions of the disclosed embodiment are described herein as being implemented on various physical devices, including, but not limited to the video player 122, the manifest server 124, the encoder 114, or the edge server 120 within a CDN 118. It would be understood by one skilled in the art that these devices may include processing devices, such as a single microprocessor, multiple microprocessors, co-processors, application specific integrated circuits (ASICs), or other computing devices operating separately, in tandem, or a combination thereof. Further, each of these devices includes storage which may include transitory storage, non-transitory storage, or a combination thereof. The storage may include memory devices such as random access memory (RAM), read-only memory (ROM), solid state memory, and the like. The storage may further include devices configured to read removable storage medium such as CD-ROMs, DVDs, floppy disks, universal serial bus (USB) devices, memory cards, and the like. The processing devices may be configured to read and execute instructions stored in non-transitory storage to perform various operations in the methods described herein.

It should be understood that the disclosure is not limited in its application to the details of construction and arrangements of the components set forth herein. The disclosure is capable of other embodiments and of being practiced or carried out in various ways. Variations and modifications of the foregoing are within the scope of the present disclosure.

It also being understood that the technology disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure.

What is claimed is:

1. A method for providing spatial adaptive enhanced video streams for playback of a 360 degree video signal, comprising:
generating at least two streaming video signals corresponding to the 360 degree video signal, wherein:
a first streaming video signal has a first resolution,
a second streaming video signal has a second resolution,
the second resolution is lower than the first resolution,
each of the first and second streaming video signals includes a plurality of frames, and
each frame spans a 360 degree viewing angle;
dividing each frame of the first and second streaming video signals into a plurality of segments, wherein each of the plurality of segments spans a portion of the 360 degree viewing angle;
generating a plurality of enhanced video streams for a 360 degree video player, wherein:
each of the plurality of enhanced video streams includes a plurality of frames, and
each frame in one of the enhanced video streams includes at least one segment from one of the plurality of frames in the first streaming video signal and at least one segment from one of the plurality of frames in the second streaming video signal; and
generating a manifest file for the 360 degree video signal to be requested by the 360 degree video player from a manifest server, wherein the manifest file comprises, for each of the plurality of enhanced video streams corresponding to the 360 degree video signal;
a first identifier that defines an address at which a respective enhanced video stream is stored, and
a second identifier that defines a direction corresponding to the portion of the 360 degree viewing angle spanned by the segment from the first streaming video signal,
the manifest file and the plurality of enhanced video streams to be distributed, for storage, to a content delivery network comprising a plurality of edge servers.

2. The method of claim 1 wherein:
each frame in the plurality of enhanced video streams includes a plurality of segments,
the plurality of segments in each frame in the plurality of enhanced video streams combine to span the 360 degree viewing angle,
one of the plurality of segments in each frame in the plurality of enhanced video streams is from the first streaming video signal, and
each of the other segments in each frame in the plurality of enhanced video streams is from the second streaming video signal.

3. The method of claim 1 wherein generating at least two streaming video signals further comprises:
receiving a spherical 360 degree video signal at the encoder;
mapping the spherical 360 degree video signal to an intermediate video signal in a representative space; and
converting the intermediate video signal to the at least two streaming video signals with the encoder.

4. The method of claim 1 further comprising at least one additional streaming video signal, wherein each additional streaming video signal has a resolution different than the first resolution and the second resolution.

5. The method of claim 1 wherein the portion of the 360 degree viewing angle spanned by each of the plurality of segments in the first streaming video signal and in the second streaming video signal corresponds to an equal number of degrees of the 360 degree viewing angle.

6. The method of claim 5, wherein:
the first streaming video signal is divided into a first set of segments and a second set of segments,
the second streaming video signal is divided into a third set of segments and a fourth set of segments,
the first set of segments corresponds to the third set of segments,
the second set of segments corresponds to the fourth set of segments,
a first viewing angle spanned by each of the first and third set of segments is different than and offset from a second viewing angle spanned by each of the second and fourth set of segments, and
a number of degrees of the offset is less than a number of degrees spanned by the first and second viewing angles.

7. A system for providing spatial adaptive enhanced video streams for playback of a 360 degree video signal, the system comprising:
an encoder including:
an input operative to receive the 360 degree video signal;
a non-transitory memory operative to store a plurality of instructions; and
a processor operative to execute the stored instructions to:
generate at least two streaming video signals corresponding to the 360 degree video signal, wherein:
a first streaming video signal has a first resolution,
a second streaming video signal has a second resolution,
the second resolution is lower than the first resolution,
each of the first and second streaming video signals includes a plurality of frames, and
each frame spans a 360 degree viewing angle;
divide each frame of the first and second streaming video signals into a plurality of segments, wherein each of the plurality of segments spans a portion of the 360 degree viewing angle;
generate a plurality of enhanced video streams for a 360 degree video player, wherein:
each of the plurality of enhanced video streams includes a plurality of frames, and
each frame in one of the enhanced video streams includes at least one segment from one of the plurality of frames in the first streaming video signal and at least one segment from one of the plurality of frames in the second streaming video signal; and
generate a manifest file for the 360 degree video signal to be requested by the 360 degree video player from a manifest server, wherein the manifest file comprises, for each of the plurality of enhanced video streams corresponding to the 360 degree video signal;

a first identifier that defines an address at which a respective enhanced video stream is stored, and a second identifier that defines a direction corresponding to the portion of the 360 degree viewing angle spanned by the segment from the first streaming video signal, the manifest file and the plurality of enhanced video streams to be distributed, for storage, to a content delivery network comprising a plurality of edge servers.

8. The system of claim 7 wherein:

each frame in the plurality of enhanced video streams includes a plurality of segments, the plurality of segments in each frame in the plurality of enhanced video streams combine to span the 360 degree viewing angle, one of the plurality of segments in each frame in the plurality of enhanced video streams is from the first streaming video signal, and each of the other segments in each frame in the plurality of enhanced video streams is from the second streaming video signal.

9. The system of claim 7 wherein the processor further executes the stored instructions to:

receive a spherical 360 degree video signal at the input of the encoder;

map the spherical 360 degree video signal to an intermediate video signal in a representative space; and convert the intermediate video signal to the at least two streaming video signals with the encoder.

10. The system of claim 7 further comprising at least one additional streaming video signal, wherein each additional streaming video signal has a resolution different than the first resolution and the second resolution.

11. The system of claim 7 wherein the portion of the 360 degree viewing angle spanned by each of the plurality of segments in the first streaming video signal and in the second streaming video signal corresponds to an equal number of degrees of the 360 degree viewing angle.

12. The system of claim of 11 wherein:

the first streaming video signal is divided into a first set of segments and a second set of segments, the second streaming video signal is divided into a third set of segments and a fourth set of segments, the first set of segments corresponds to the third set of segments, the second set of segments corresponds to the fourth set of segments, a first viewing angle spanned by each of the first and third set of segments is different than and offset from a second viewing angle spanned by each of the second and fourth set of segments, and a number of degrees of the offset is less than a number of degrees spanned by the first and second viewing angles.

13. A method for displaying a spatial adaptive enhanced video stream for playback of a 360 degree video signal, having a 360 degree viewing angle, the method comprising:

transmitting a request to view the 360 degree video signal to a manifest server from a 360 degree video player;

receiving at the 360 degree video player from the manifest server a manifest file corresponding to the 360 degree video signal, wherein the manifest file includes:

a plurality of first identifiers, wherein:

each first identifier defines an address at which one of a plurality of enhanced video streams is stored, wherein the manifest file the plurality of enhanced video streams were distributed, for storage, to a content delivery network comprising a plurality of edge servers, each enhanced video stream includes a plurality of frames, each frame in each enhanced video stream includes at least one segment from a first streaming video signal and at least one segment from a second streaming video signal, the first streaming video signal is generated from the 360 degree video signal at a first resolution, the second streaming video signal is generated from the 360 degree video signal at a second resolution, and the second resolution is less than the first resolution; and a plurality of second identifiers, wherein each second identifier defines a direction of viewing within one of the enhanced video streams corresponding to a portion of the 360 degree viewing angle spanned by the at least one segment from the first streaming video signal; and obtaining, by the 360 degree video player using a desired direction of viewing of a user, one of the plurality of enhanced video streams from the address at which it is stored as a function of the desired direction of viewing within the 360 degree video signal corresponding to the direction in one of the plurality of second identifiers.

14. The method of claim 13 further comprising:

receiving an input signal at the 360 degree video player from a direction interface, wherein the input signal corresponds to the desired direction of viewing within the 360 degree video signal;

reading the plurality of second identifiers to identify the enhanced video stream with the at least one segment from the first streaming video signal in the direction corresponding to the desired direction of viewing; and reading the address from the plurality of first identifiers for the identified enhanced video stream.

15. The method of claim 14 wherein:

the 360 degree video player receives the input signal from the direction interface at a periodic interval and reads a new address from the plurality of first identifiers for each identified enhanced video stream;

the 360 degree video player plays back a first segment of the 360 degree video signal from a first enhanced video stream corresponding to a first desired direction of viewing; and the 360 degree video player plays back a second segment of the 360 degree video signal from a second enhanced video stream corresponding to a second desired direction of viewing.

16. The method of claim 13 wherein:

each frame in the plurality of enhanced video streams includes a plurality of segments, the plurality of segments in each frame in the plurality of enhanced video streams combine to span the 360 degree viewing angle, one of the plurality of segments in each frame in the plurality of enhanced video streams is from the first streaming video signal, and each of the other segments in each frame in the plurality of enhanced video streams is from the second streaming video signal.

17. The method of claim 13 wherein the portion of the 360 degree viewing angle spanned by each of the plurality of segments in the first streaming video signal and in the second streaming video is an equal number of degrees of the 360 degree viewing angle.

18. The method of claim 17 wherein:
the first streaming video signal is divided into a first set of segments and a second set of segments,
the second streaming video signal is divided into a third set of segments and a fourth set of segments,
the first set of segments corresponds to the third set of segments,
the second set of segments corresponds to the fourth set of segments,
a first viewing angle spanned by each of the first and third set of segments is different than and offset from a second viewing angle spanned by each of the second and fourth set of segments, and
a number of degrees of the offset is less than a number of degrees spanned by the first and second viewing angles.

* * * * *